United States Patent [19]

Baumann

[11] Patent Number: 5,685,200
[45] Date of Patent: Nov. 11, 1997

[54] BRAKE PRESSURE ROD

[75] Inventor: Hans-Uwe Baumann, Stuttgart, Germany

[73] Assignee: Dr. Ing. h.c.F. Porsche AG, Weissach, Germany

[21] Appl. No.: 531,347

[22] Filed: Sep. 20, 1995

[30] Foreign Application Priority Data

Oct. 21, 1994 [DE] Germany .......................... 44 37 658.8

[51] Int. Cl.[6] .................................. G05G 1/14; F16F 7/12
[52] U.S. Cl. ........................ 74/512; 74/579 R; 188/377
[58] Field of Search ........................ 74/579 R, 581,
74/512, 560; 188/371, 377; 280/784; 60/547.1

[56] References Cited

U.S. PATENT DOCUMENTS

| | | | |
|---|---|---|---|
| 2,884,803 | 5/1959 | Willis | 74/512 |
| 3,302,481 | 2/1967 | Kenrick et al. | 74/512 |
| 3,388,610 | 6/1968 | Pyle et al. | 74/512 |
| 4,698,971 | 10/1987 | Sansone | 74/512 X |
| 4,870,871 | 10/1989 | Ivan | 74/512 X |
| 4,901,426 | 2/1990 | Laue | 74/512 X |
| 5,273,314 | 12/1993 | Sakakibara | 188/377 X |
| 5,456,137 | 10/1995 | Laue | 74/579 R |

FOREIGN PATENT DOCUMENTS

| | | |
|---|---|---|
| 0 121 114 B1 | 10/1984 | European Pat. Off. . |
| 0 229 350 A3 | 7/1987 | European Pat. Off. . |
| 3307887 | 9/1984 | Germany .................. 74/512 |
| 93 15 502.6 | 1/1994 | Germany . |

*Primary Examiner*—Rodney H. Bonck
*Assistant Examiner*—Mary Ann Battista
*Attorney, Agent, or Firm*—Evenson McKeown Edwards & Lenahan PLLC

[57] ABSTRACT

A brake pressure rod is described for operating a vehicle brake and is arranged between a pedal and a brake booster. The brake pressure rod consists of an extruded profile with breakthroughs. On one end of the brake pressure rod, a bearing is arranged for the pedal and, on an opposite end, a receiving device is arranged for a rod of the brake cylinder. The brake pressure rod has a desired buckling point which, in the case of a pedal made of plastic and a brake pressure rod made of a light metal alloy, shifts danger as a result of destruction from the pedal to the brake pressure rod.

19 Claims, 4 Drawing Sheets

BRAKE PRESSURE ROD

BACKGROUND AND SUMMARY OF THE INVENTION

This invention relates to a brake pressure rod for operating a motor vehicle brake, which brake pressure rod is disposed between a brake pedal and a brake booster.

From European Patent Document EP 0 121 114 B 1, a brake pressure rod is known which consists of two pins and a connecting sleeve in which the two pins are respectively held with one end. On the end of one pin facing the pedal, a fork-shaped receiving device for the pedal is provided.

It is an object of the invention to provide a brake pressure rod which establishes a secure connection between the pedal and the brake booster and which can be mounted and produced in a simple manner.

According to the invention, this object is achieved by providing a brake pressure rod formed as a section of an extruded profile, having breakthroughs, one end having a bearing for a brake pedal and an opposite end having a receiving bore for a brake booster rod.

The principal advantages achieved by the invention are that the brake pressure rod can be manufactured in a simple and low-cost manner from an extruded profile with transversely extending ribs and breakthroughs, for example, by cutting a length off a billet.

This pressure rod is preferably designed such that a fork-shaped bearing for the pedal as well as a pin receiving device for a brake booster are molded to the free ends. Furthermore, on the exterior side of the pressure rod, which otherwise has a smooth surface, moldings are shaped on in the form of grooves which are used for holding sealing bellows.

For receiving the pedal in the fork-shaped bearing, this bearing has a wider construction than the shaft of the pressure rod. In particular, the shaft widens from an area of the pressure rod to the fork head.

A locking device is provided between the pressure rod and the brake booster and ensures an uncomplicated and rapid connection between these components. For this purpose, the brake booster is provided with a pin which has a smaller diameter, which is inserted into a receiving bore of a rib in the pressure rod and which is held on the rib by means of a locking plate. The locking plate engages in a groove of the pin and, as a result, the pressure rod is supported on the rib.

In certain preferred embodiments, the pressure rod is made of a light metal alloy, has a desired buckling point and is designed as a crash safety pressure rod. For this purpose, a zone with a desired buckling point is provided in an area behind the fork head. This desired buckling point is arranged, for example, as a bent area in a rib. Constructively, by way of the aging stability of the material, this desired buckling point is designed such that, starting at a given force, a defined failure can take place. The desired buckling point is addressed when the driver has his foot on the pedal and a high force is introduced during a crash. Furthermore, in the case of the most extreme misuse, the brake pressure rod is deformed in the desired buckling point. The deformation of the pressure rod is always dimensioned such that braking can still take place to a limited extent although the rod is deformed.

In particular, the desired buckling point is provided in certain preferred embodiments in the case of a combination of a pedal made of plastic and a pressure rod made of a light metal alloy, particularly an aluminum alloy, because, as a result, the weakest link in the chain is displaced from the pedal to the metallic pressure rod.

Other objects, advantages and novel features of the present invention will become apparent from the following detailed description of the invention when considered in conjunction with the accompanying drawings.

DETAILED DESCRIPTION OF THE INVENTION

Figure 4:
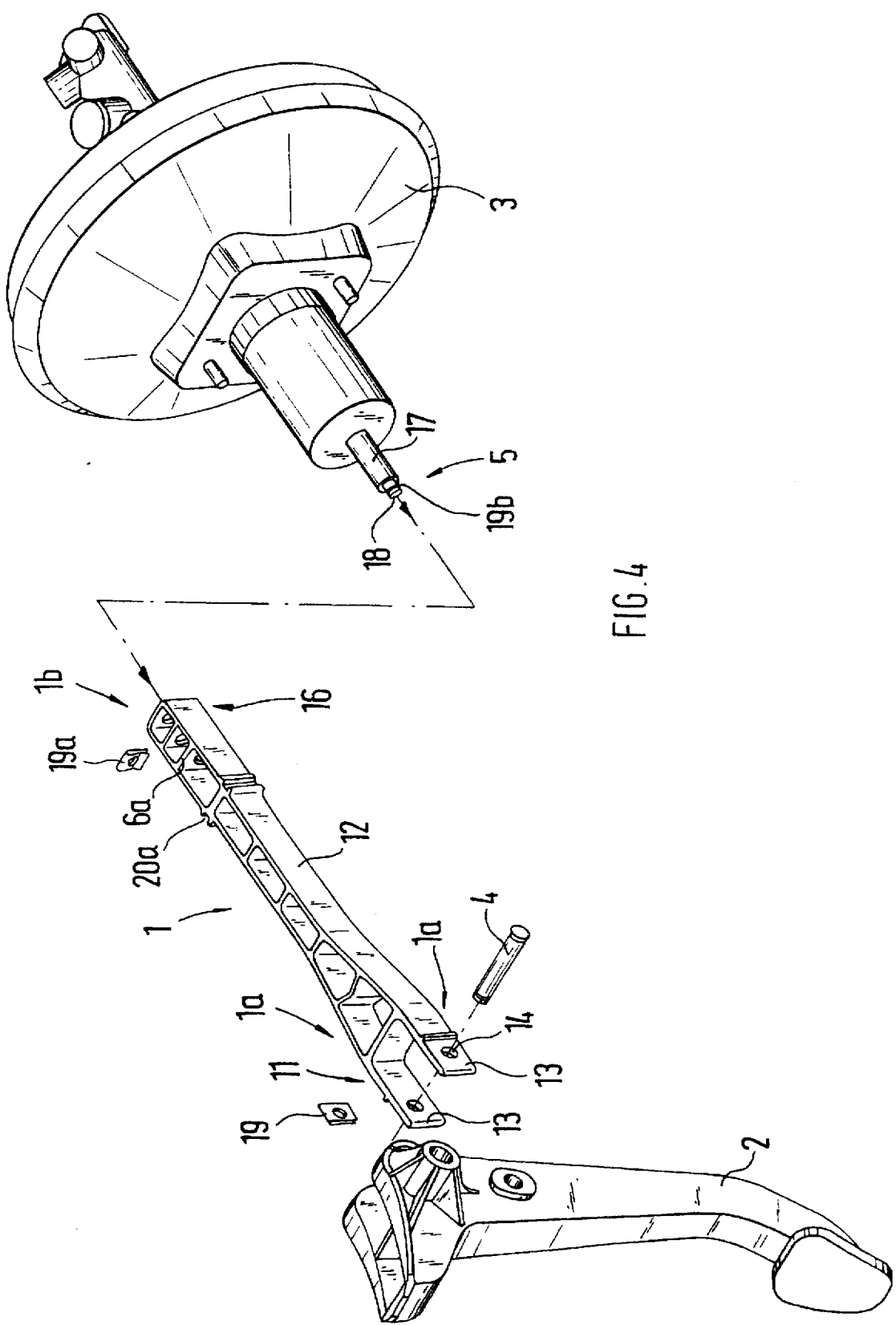
FIG. 4 is an exploded perspective view with a diagrammatic representation of the arrangement of the brake pressure rod of FIG. 1 between a pedal and a brake booster with bearing and fastening devices.
Figure 5:
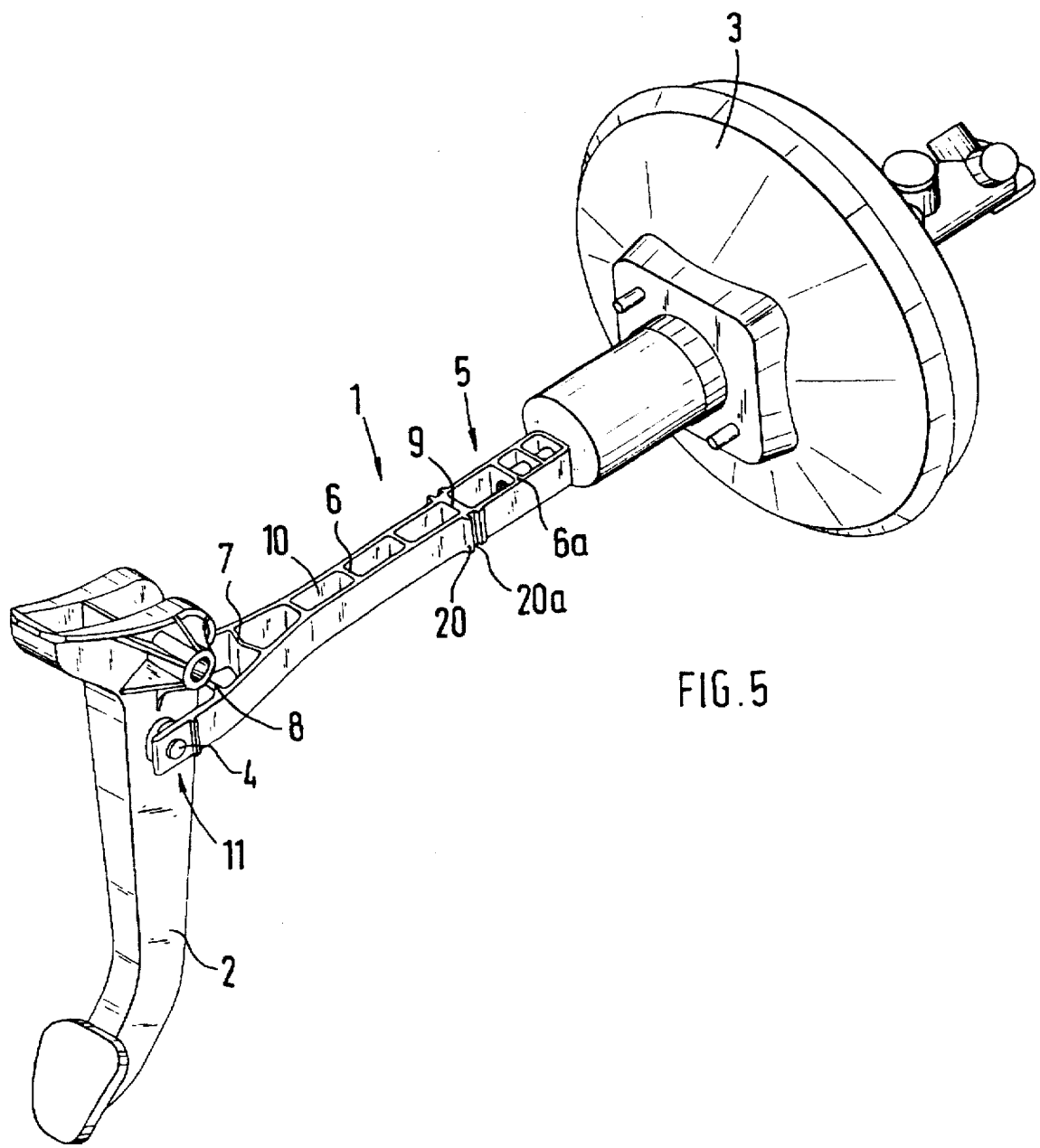
FIG. 5 is a perspective view of an assembled constructional unit consisting of the pedal, the brake pressure rod and the brake booster.

As best shown in FIGS. 4 and 5, a brake pressure rod 1 is arranged between a pedal 2 and a brake booster 3 and is connected with the pedal 2 by means of a pin 4 and with the brake booster 3 by means of a quick-acting closing device 5.

The brake pressure rod 1 is preferably made of a light metal alloy but may also consist of a plastic material according to certain preferred embodiments. In the light metal construction, the pressure rod 1 is designed as an extruded profile and has transversely extending parallel ribs 6, 6a, 7, 8 and 9 with breakthroughs 10 situated in-between these ribs.

The pedal 2 is held in a fork head 11 so that it can be swivelled by way of the connecting pin 4. The fork head 11 widens continuously with respect to the shaft 12 of the pressure rod 1 and, on one end 1a, has two legs 13 with one receiving bore 14 respectively.

The connection of the pressure rod 1 with the brake booster 3 takes place by way of the quick-acting closing device 5. This quick-acting closing device 5 comprises essentially a booster rod 17 as well as, at the end 1b insertion through-bores 15 in the ribs 6 and a fastening bore 16 of a smaller diameter in the additional rib 6a. On the brake booster 3, the booster rod 17 is fastened which has a connecting pin 18 which has a smaller diameter and a ring groove 19b. The pin 18 is arranged in the bore 16 and is locked by way of a locking plate 19 or clip which engages in the ring groove 19b and supports and fixes the pin 18 in the direction of the rib 6a. For the purpose of compensating tolerances or for adjusting, this connecting pin 18 may also be held in an adjustable manner in certain contemplated embodiments, for example, by way of a thread, in the rod 17.

Figure 1:
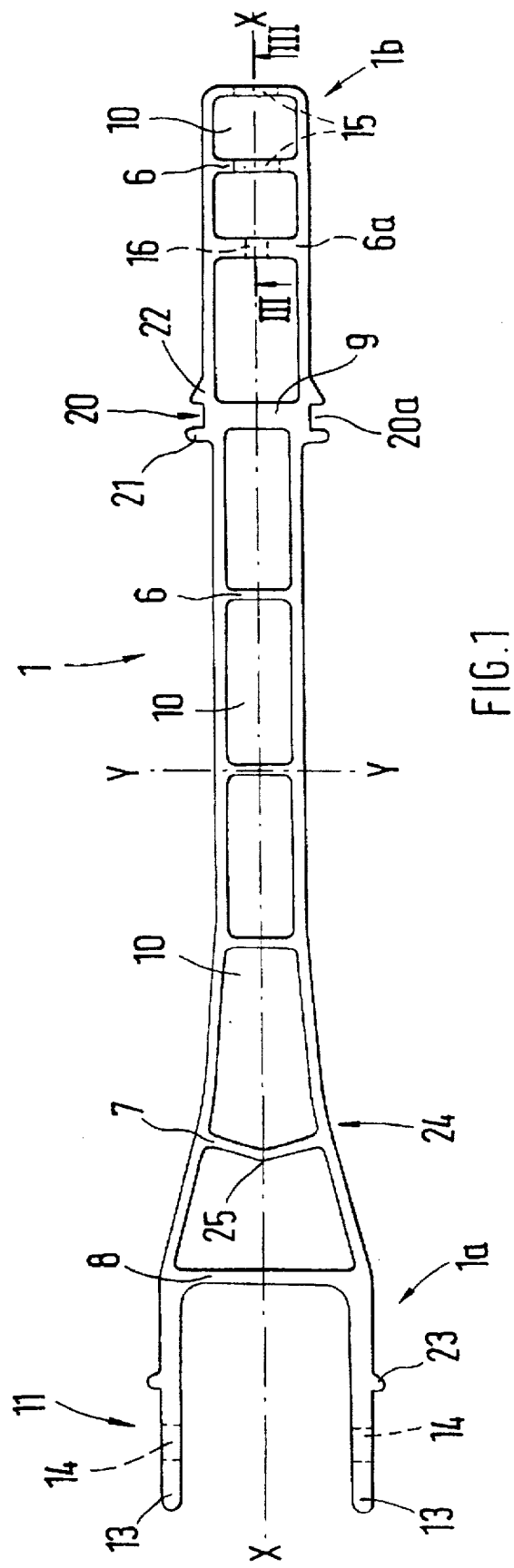
FIG. 1 is a top view of a brake pressure rod constructed according to a preferred embodiment of the invention.
Figure 2:
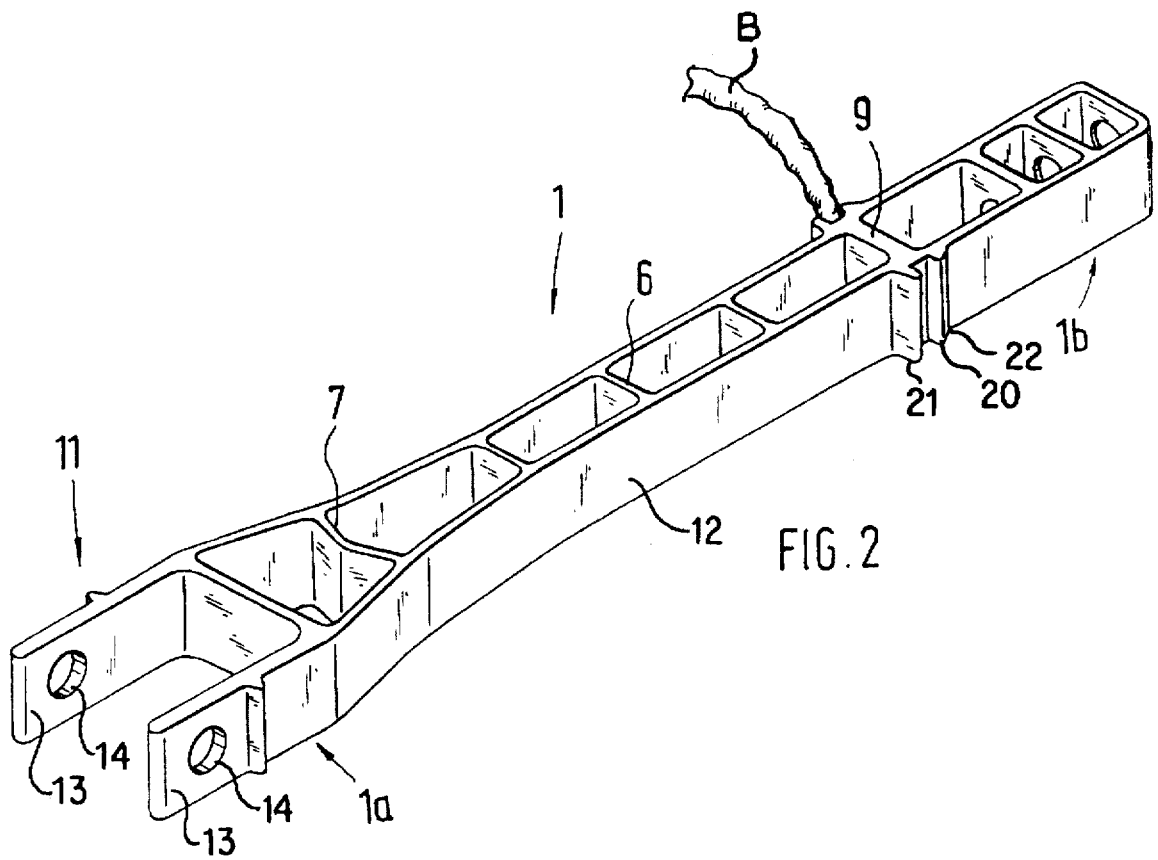
FIG. 2 is a perspective diagrammatic representation of the brake pressure rod of FIG. 1.
Figure 3:
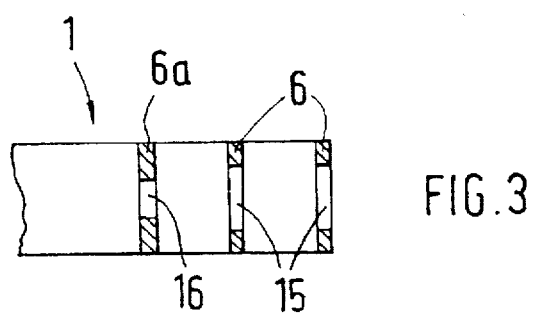
FIG. 3 is a sectional view taken along Line III—III of FIG. 1 and showing a receiving device of the brake pressure rod.

The pressure rod 1 is obtained from an extruded profile by cutting a length off a long profiled section. It has a smooth surface on the outside, with the exception of a groove-shaped receiving device 20 for sealing bellows B schematically depicted in FIG. 2. This receiving device 20 comprises two exterior-side webs 21 and 22, one web 22 having an oblique mounting surface. Reinforcing webs 23 are arranged on the outside on the legs 13 of the fork head 11.

In the shaft 12, the brake pressure rod 1 has at least one desired buckling point 24 in the area of the fork head 11.

This desired buckling point 24 is formed by a rib 7 which is slightly buckled at an obtuse angle. The buckling at the obtuse angle has a buckling tip 25 which points to the fork head 11. This desired buckling point 24 is arranged in a rib 7 which is directly adjacent to the rib 8 of the fork head 11.

In the case of a brake pressure rod 1 made of a light metal alloy and a pedal 2 made of plastic, the desired buckling point 24 is required so that, in the case of excessive forces, the brake pressure rod 1 and not the pedal 2 will be damaged.

In the case of a suspended brake pedal 2, the brake pressure rod 1 is arranged such that the breakthroughs extend in a perpendicular plane, and the ribs 6, 6a, 7, 8 and 9 extend in a transverse plane Y—Y with respect thereto.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A brake pressure rod assembly connectable in use between a brake pedal member and a brake booster connecting pin to transmit brake control forces therebetween, comprising:

a brake pressure rod formed with a pair of side walls connected by a plurality of transverse ribs which separate transverse hollow breakthrough openings spaced along said side walls, a first end of said brake pressure rod having a bearing support which is pivotally connectable with the brake pedal member and an opposite second end of said brake pressure rod having a first longitudinally extending connecting pin accommodating opening in an end most of said transverse ribs.

2. A brake pressure rod assembly according to claim 1, wherein said brake pressure rod is formed as an extruded profile member formed of aluminum.

3. A brake pressure rod assembly according to claim 1, wherein said brake pressure rod is formed as an extruded profile member formed of plastic.

4. A brake pressure rod assembly according to claim 1, comprising a locking plate for detachably connecting one end of said brake pressure rod with said brake booster connecting pin, said locking plate being engageable in a groove on said connecting pin when in an in use position.

5. A brake pressure rod assembly according claim 1, comprising grooves formed by transversely projecting protrusions on said side walls, said grooves being configured to accommodate sealing bellows.

6. A brake pressure rod assembly according claim 5, wherein said grooves are located adjacent one of said transverse ribs.

7. A brake pressure rod assembly according to claim 6, wherein one of said protrusions forming said grooves is provided with a chamfering.

8. A brake pressure rod assembly according to claim 1, wherein said brake pressure rod is an extruded profile member.

9. A brake pressure rod assembly according to claim 2, wherein a second of said transverse ribs includes a second longitudinally extending connecting pin accommodating opening aligned with said first opening.

10. A brake pressure rod assembly according to claim 9, wherein a third of said transverse ribs includes a third longitudinally extending connecting pin accommodating opening aligned with said first and second openings.

11. A brake pressure rod assembly according to claim 10, comprising a locking plate for detachably connecting an end of said brake pressure rod with said brake booster connecting pin, third transverse rib to engage in a ring groove provided on said connecting pin.

12. A brake rod assembly according to claim 1, wherein said bearing support includes aligned transverse openings in said side walls, said side walls adjacent said transverse openings forming a fork head which in use encloses the brake pedal member, said transverse openings being configured to support a bearing pin through the brake pedal member.

13. A brake pressure rod assembly according to claim 12, wherein one of said transverse ribs is provided with a predetermining buckling point which facilitates intentional longitudinal buckling of said pressure rod by accommodating spreading of said side walls forming the fork head in response to excessive brake pedal member forces on said pressure rod during a collision when used on a vehicle.

14. A brake pressure rod assembly according to claim 12, wherein said fork head is wider than other portions of the length of the brake pressure rod.

15. A brake pressure rod assembly according to claim 14, wherein said pressure rod side walls exhibit a continuously widening outer contour in a direction leading to the fork head.

16. A brake pressure rod assembly according to claim 14, wherein, starting from a central area of the brake pressure rod, said side walls define an outer contour which has a continuous widening in a direction of the fork head.

17. A brake pressure rod assembly according to claim 12, wherein said brake pressure rod is an extruded profile member.

18. A brake pressure rod assembly according to claim 17, wherein said brake pressure rod is formed of aluminum.

19. A brake pressure rod assembly according to claim 17, wherein said brake pressure rod is formed of plastic.

* * * * *